United States Patent Office 2,894,815
Patented July 14, 1959

2,894,815

PRODUCTION OF AMMONIUM THIOCYANATE

William R. Rolingson, Texas City, Tex., assignor to Monsanto Chemical Company, St. Louis, Mo., a corporation of Delaware No Drawing. Application September 12, 1956
Serial No. 609,405

6 Claims. (Cl. 23—75)

This invention relates to a method of preparing ammonium thiocyanate.

It is known that ammonium thiocyanate can be prepared from hydrocyanic acid, ammonia, and sulfur in the presence of aqueous ammonium sulfide, the latter serving as a solvent for the sulfur. This process has certain drawbacks in commercial operation, however, in that the reaction is usually slow and the product may have an undesirable color, the depth and extent of the color varying directly with the reaction time, unless the reaction conditions are very closely controlled.

It is an object of the present invention, therefore, to provide an improved process for preparing ammonium thiocyanate of high purity. A further object is to provide an improved process for preparing ammonium thiocyanate from hydrocyanic acid, ammonia, and sulfur. Further objects will be apparent from the following description of the invention.

According to the invention, excellent yields of ammonium thiocyanate of high purity are obtained by reacting ammonia, hydrocyanic acid, and sulfur in a solution of ammonium thiocyanate and ammonia as a reaction medium. The use of this solution as a reaction medium eliminates the necessity for including a solvent in the reaction and thus considerably simplifies the overall process and makes it particularly adaptable to continuous operation.

The invention is illustrated in the following example which, however, is presented only for illustrative purposes and is not to be construed as limiting it in any manner.

*Example*

The reaction was carried out in a 500-ml., 3-necked flask submerged in an ice bath and fitted with a motor-driven stirrer, a dropping funnel, and a glass dip tube. The neck carrying the dip tube was left open otherwise to permit the free passage of gas from the flask. The flask was initially charged with a solution of ammonium thiocyanate in ammonia prepared by passing ammonia gas over 50 g. of solid ammonium thiocyanate at 15° C. until the latter was completely dissolved. To this solution was added 8.0 g. of flowers of sulfur. Over a period of 50 minutes, 13.5 g. of liquid hydrocyanic acid was added dropwise via the dropping funnel while the slurry in the flask was constantly stirred and ammonia from a cylinder connected to the dip tube was bubbled continuously through it. During this period also 8.0 more grams of sulfur was added through the one open neck of the flask. The temperature during addition of the reactants was maintained below 20° C. by means of the ice bath.

After the addition of the hydrocyanic acid was complete, the ice bath was removed and the reaction mixture was purged with ammonia while it was stirred for one hour and 45 minutes. During this time, the temperature rose spontaneously to 34° C. The solution was then transferred to a tared one-liter flask and heated under vacuum over a steam bath. When the contents of the flask had evaporated to dryness, the flask was removed from the steam bath and weighed. No odor of ammonia was perceptible in the product and an infrared spectrum of the material was identical with the spectrum for ammonium thiocyanate with no detectable impurities. The melting point of the product was 144–147° C. which was identical to that of an authentic sample of pure ammonium thiocyanate determined simultaneously. The yield of ammonium thiocyanate was approximately 80%.

Many variations in reaction conditions from those given in the example may be made without departing from the scope of the invention. In the preparation of the ammonium thiocyanate solution in ammonia which is employed as the reaction medium either liquid or gaseous ammonia may be used. Crystalline thiocyanates rapidly absorb gaseous ammonia and can be easily dissolved by bringing them into contact with ammonia even under conditions of temperature and pressure at which ammonia itself will not liquefy. Alternatively, the crystalline thiocyanate may be dissolved in liquid ammonia. In dissolving ammonium thiocyanate in liquid ammonia or in liquefying it with ammonia gas, a certain amount of heat is given off which can be taken care of either by evaporation of an excess of liquid ammonia, by external cooling, by a combination of these two methods, or otherwise by any of the known techniques for heat removal. When using ammonia gas, for example, it is normally satisfactory to maintain the ammonium thiocyanate at a temperature below 30° C. and preferably to keep it in the range from about 5° to about 15° C. by means of cooling coils or external cooling. When using liquid ammonia to dissolve ammonium thiocyanate, an excess of liquid ammonia can be used and the vaporization of this excess ammonia arising as a result of its low temperature (about —35° C.) prevents any substantial rise in temperature occasioned by the exothermic heat or solution. The vaporized ammonia can be recompressed and re-used for producing more of the reaction medium or can be re-used directly as a reactant gas in the process.

While it is preferred to practice this invention at atmospheric pressure at temperatures in the range from 0° to 70° C. and preferably at temperatures from about 40° to about 50° C., it is within the scope of the invention to use elevated temperatures and pressures. Reaction times and temperatures are interdependent with the reaction proceeding more rapidly as the temperature is increased. If the reaction is carried out at higher temperatures, it is necessary to use a closed system such as a pressure vessel in order to avoid low yields of ammonium thiocyanate due to loss of hydrogen cyanide and ammonia.

Instead of the procedure followed in the example, hydrogen cyanide gas can be bubbled into the reaction medium simultaneously with the ammonia. There is nothing critical about the order in which the reactants are fed to the reaction. Stoichiometric, i.e., equimolecular, quantities of hydrocyanic acid, sulfur, and ammonia are employed for the reaction and enough ammonia is added over and above that required for reaction to maintain the solution of ammonium thiocyanate therein as the reaction medium.

While the process of the invention can be satisfactorily conducted as a batch operation, it is particularly adaptable to successful continuous operation. In continuous operation, only an initial charge of ammonium thiocyanate in solution in ammonia is required, the reaction medium thereafter being automatically perpetuated in the process. The reactants can be continuously fed into the reaction medium and a solution of ammonium thiocyanate in ammonia continuously withdrawn, filtered or centrifuged to remove any entrained sulfur, and then heated to drive off ammonia and recover the dry crystalline product in an extremely pure state. Ammonia evaporated from the solution can be readily recycled to the reaction as can any sulfur recovered in the filtration step.

What is claimed is:

1. An improved process for producing ammonium thiocyanate which comprises reacting together anhydrous hydrocyanic acid, anhydrous ammonia and sulfur in a reaction medium consisting of a solution of ammonium thiocyanate in anhydrous ammonia.

2. An improved process for producing ammonium thiocyanate which comprises reacting together anhydrous hydrocyanic acid, anhydrous ammonia and sulfur at a temperature in the range from about 0° C. to about 70° C. in a reaction medium consisting of a solution of ammonium thiocyanate in anhydrous ammonia.

3. An improved process for producing ammonium thiocyanate which comprises reacting together anhydrous hydrocyanic acid, anhydrous ammonia and sulfur at a temperature in the range from about 40–50° C. in a reaction medium consisting of a solution of ammonium thiocyanate in anhydrous ammonia.

4. An improved process for the preparation of ammonium thiocyanate which comprises continuously adding anhydrous ammonia, anhydrous hydrocyanic acid, and sulfur to a solution of ammonium thiocyanate in anhydrous ammonia while maintaining the temperature of the reaction in the range from 0° to 70° C., continuously removing a solution of ammonium thiocyanate in ammonia, filtering said solution to remove any entrained solid particles of sulfur, heating the filtrate until it is free of ammonia and recovering solid ammonium thiocyanate.

5. An improved process for the preparation of ammonium thiocyanate which comprises continuously adding anhydrous ammonia, anhydrous hydrocyanic acid, and sulfur to a solution of ammonium thiocyanate in anhydrous ammonia while maintaining the temperature of the reaction in the range from 40° to 50° C., continuously removing a solution of ammonium thiocyanate in ammonia, filtering said solution to remove any entrained solid particles of sulfur, heating the filtrate until it is free of ammonia and recovering solid ammonium thiocyanate.

6. An improved process for the preparation of ammonium thiocyanate which comprises continuously adding anhydrous ammonia, anhydrous hydrocyanic acid, and sulfur to a solution of ammonium thiocyanate in anhydrous ammonia while maintaining the temperature of the reaction in the range from 40° to 50° C., continuously removing a solution of ammonium thiocyanate in ammonia, filtering said solution to remove any entrained solid particles of sulfur, heating the filtrate until it is free of ammonia, recycling the ammonia driven off from said filtrate to the reaction step, and recovering solid ammonium thiocyanate.

References Cited in the file of this patent

UNITED STATES PATENTS

| | | |
|---|---|---|
| 2,249,962 | Lento et al. | July 22, 1941 |
| 2,293,031 | Foster et al. | Aug. 18, 1942 |
| 2,678,871 | Russell | May 18, 1954 |